April 21, 1925.
A. T. BROWN
PIVOTAL BEARING
Filed Sept. 7, 1920
1,534,501
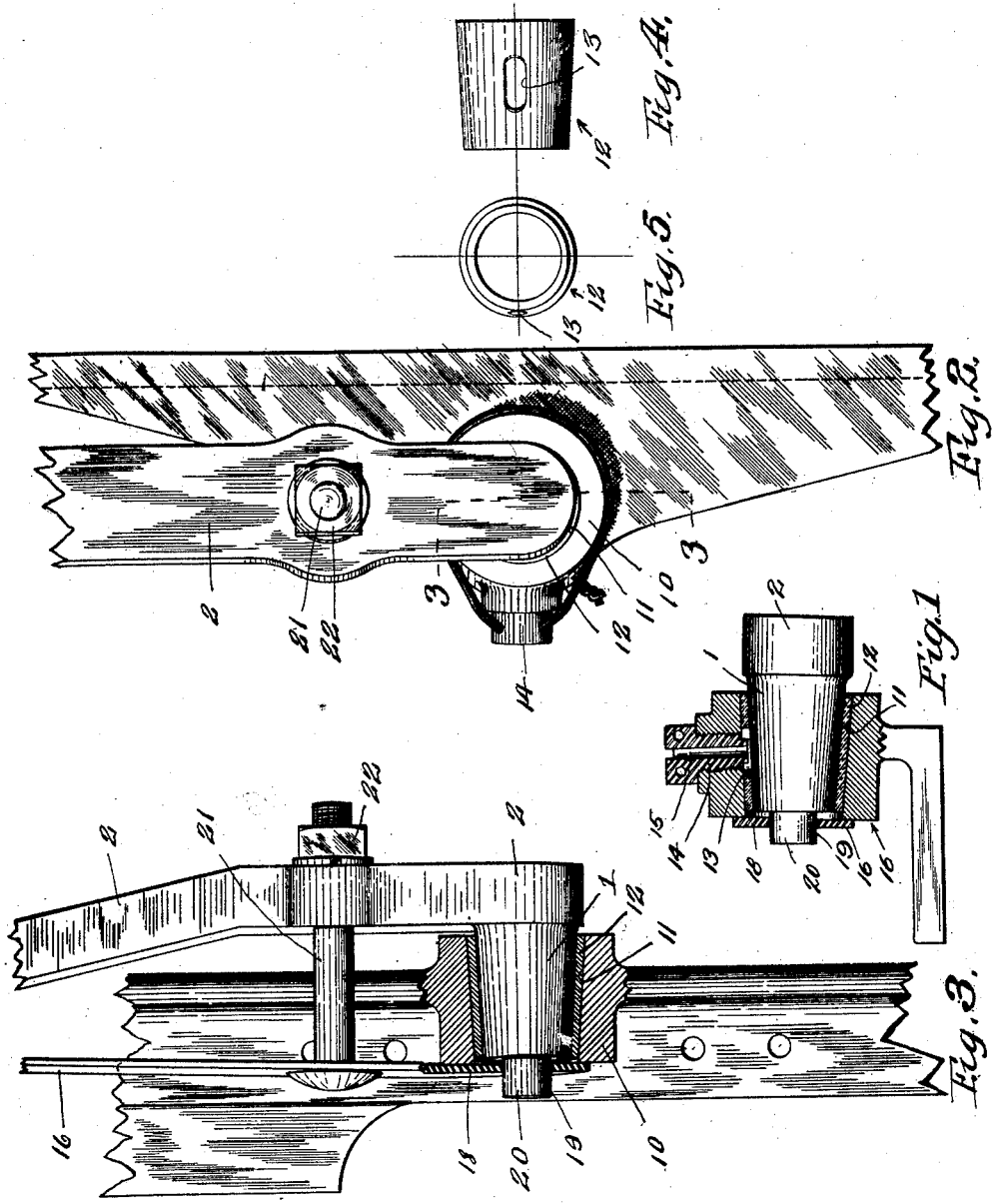
WITNESS:
INVENTOR.
Alexander T. Brown
BY
Parmer & Bodell
ATTORNEYS.

Patented Apr. 21, 1925.

1,534,501

UNITED STATES PATENT OFFICE.

ALEXANDER T. BROWN, OF SYRACUSE, NEW YORK.

PIVOTAL BEARING.

Application filed September 7, 1920. Serial No. 408,497.

*To all whom it may concern:*

Be it known that I, ALEXANDER T. BROWN, a citizen of the United States, residing at Syracuse, in the county of Onondaga and State of New York, have invented a certain new and useful Pivotal Bearing, of which the following is a specification.

This invention relates to pivotal joints or bearings such for example as the bearing between the pitman, and a part actuated or reciprocated by the pitman, and has for its object a particularly simple and efficient construction for keeping the joint or bearing tight. The invention consists in the novel features and in the combinations and constructions hereinafter set forth and claimed.

In describing this invention, reference is had to the accompanying drawings in which like characters designate corresponding parts in all the views.

Figure 1 is a sectional view of this pivotal bearing.

Figure 2 is a fragmentary view of this pivotal joint and contiguous parts, showing the same in end elevation.

Figure 3 is an elevation of parts seen in Fig. 2 looking to the right, the bearing being shown in section on line 3—3, Fig. 2.

Figures 4 and 5 are respectively an elevation and an end view of the conical bushing used in the bearing.

This joint or bearing comprises, generally, a conical spindle, a member mounted on the spindle and having a conical bearing for receiving the spindle, and means for pressing the bearing member on the conical spindle in order to automatically take up any looseness which may develop, especially during the rapid operations of the pitman.

1 designates the conical spindle which is here shown as mounted on one end of a pitman 2. The pitman being mounted on a crank pin in the usual manner.

The pitman is designed to be used to transmit a reciprocating movement from a crank to a knife of a motor.

10 is the knife-head or bearing member on the knife, said bearing being mounted on the spindle 1 and having a conical opening 11 for receiving the spindle, a bushing 12 being located in the opening for taking the wear, as will be understood by those skilled in the art. This bushing is held from turning with the spindle in any suitable manner, and as here shown it is formed with a slot 13 into which extends one end of a key as a screw 14 threading radially into the member 10 and provided with the oil passage 15.

The means for pressing the bearing member 10 onto the conical spindle 1 comprises a spring 16 pressing against the outer end of the bearing member, this spring being shown as a strip which for convenience is called a flat spring in contradistinction to a coiled spring, the spring being secured at one end at 17 to the pitman and having its other end 18 pressing on the outer end of the bearing 10, it being here shown as formed with an opening 19 for receiving the axial stud 20 on the end of the conical spindle 1.

The spring is tensioned by means of a member as a bolt 21 extending transversely of the spring and the pitman between the ends of the spring and connected at one end to the spring, its other end portion extending through the pitman and beyond the same for receiving the nut 22 threading on said bolt. The bolt 21 also extends through an opening in the spring and the head of the bolt overlies the spring.

In operation, any looseness that may develop on account of wear is automatically taken up and hence the mower knife can be run at high speed with minimum noise and vibration, and resulting loss of power.

The crank pin on which the pitman is mounted is of greater length than the bearing of the pitman on the crank pin, in order to provide clearance to permit shifting of the pitman by the spring 16 in taking up wear between the bearing 10 or bushing 12 thereon and the conical spindle 1.

In use in agricultural and harvesting machines as mowers and binders, the knives are reciprocated very rapidly and looseness in the bearing between the pitman and the knife head develops very rapidly and results in noise, excessive vibration and loss of power. By reason of the conical bearing and spindle on the knife head and pitman, the spring effecting relative axial movement of the spindle and its bearing, looseness is taken up and owing to the bushing the bearing can be renewed at little expense and loss of time.

What I claim is:

The combination of a pitman having a tapering spindle, an element having a conical bearing on the spindle, a bushing located in the bearing and encircling the spindle and connected to the bearing to be held from rotatable movement relatively to the bearing and to slide axially on the tapered spindle and in the tapered bearing and spring means carried by the pitman for pressing the bearing and bushing on the axially tapering spindle, substantially as and for the purpose specified.

In testimony whereof, I have hereunto signed my name, at Syracuse, in the county of Onondaga, and State of New York, this 3rd day of September, 1920.

ALEXANDER T. BROWN.